(12) United States Patent
Grasso et al.

(10) Patent No.: US 6,517,098 B2
(45) Date of Patent: Feb. 11, 2003

(54) DEVICE TO ALIGN HITCH

(76) Inventors: Victor L. Grasso, Hitch-Align, 1572 Hasting Dr., Manteca, CA (US) 95336; Gene M. Chronister, 26924 Creole Pl., Hayward, CA (US) 94545

( * ) Notice: Subject to any disclaimer, the term of this patent is extended or adjusted under 35 U.S.C. 154(b) by 0 days.

(21) Appl. No.: 09/987,726

(22) Filed: Nov. 15, 2001

(65) Prior Publication Data

US 2002/0056971 A1 May 16, 2002

Related U.S. Application Data

(60) Provisional application No. 60/248,215, filed on Nov. 15, 2000.

(51) Int. Cl.⁷ .................................................. B60D 1/40
(52) U.S. Cl. ........................ 280/477; 33/264; 116/28 R
(58) Field of Search ................................ 280/477, 511; 33/264; 359/872; 116/28 R

(56) References Cited

U.S. PATENT DOCUMENTS

| | | | |
|---|---|---|---|
| 3,015,162 A | * | 1/1962 | Bohnet |
| 3,918,746 A | * | 11/1975 | Lehtisaari ..................... 20/477 |
| 4,169,610 A | | 10/1979 | Paufler |
| D270,906 S | | 10/1983 | Orr |
| 4,583,481 A | | 4/1986 | Garrison |
| 4,666,176 A | * | 5/1987 | Sand ........................... 280/477 |
| D307,564 S | | 5/1990 | Mabry |
| 5,035,441 A | | 7/1991 | Murray |
| D331,900 S | | 12/1992 | Simmen |
| D332,595 S | | 1/1993 | Randolph |
| D342,226 S | | 12/1993 | Rahn |
| 5,269,554 A | * | 12/1993 | Law et al. ................... 280/477 |
| 5,558,352 A | * | 9/1996 | Mills ........................... 280/477 |
| 5,680,706 A | | 10/1997 | Talcott |
| 5,711,245 A | | 1/1998 | Knirck |
| 5,927,229 A | | 7/1999 | Karr, Jr. |
| 5,970,619 A | | 10/1999 | Wells |
| 6,139,041 A | * | 10/2000 | Murphy ....................... 280/477 |
| 6,209,902 B1 | * | 4/2001 | Potts ........................... 280/477 |

FOREIGN PATENT DOCUMENTS

| | | |
|---|---|---|
| FR | 2 3887 141 | 12/1978 |
| GB | 934358 | 8/1963 |
| GB | WO 90/14968 | 12/1990 |

* cited by examiner

*Primary Examiner*—Anne Marie Boehler
(74) *Attorney, Agent, or Firm*—Richard C. Litman

(57) ABSTRACT

An alignment device to align a vehicle's trailer hitch ball neck assembly with a trailer hitch socket assembly or tongue assembly. The present invention includes two units, each having uprights with engaging press on members. The ball neck upright member has a "C"-shaped bottom portion for frictionally engaging the neck of the trailer hitch ball neck, and the hitch engaging upright member has a "U"-shaped bottom portion for frictionally engaging the outer housing of the hitch socket member around its lower end periphery. When used in conjunction with each other, the two poles visually assist the vehicle operator in aligning the vehicles so that they may be easily coupled together for towing.

13 Claims, 3 Drawing Sheets

DEVICE TO ALIGN HITCH

CROSS-REFERENCE TO RELATED APPLICATION

This application claims the benefit of U.S. Provisional Patent Application Serial No. 60/248,215, filed Nov. 15, 2000.

BACKGROUND OF THE INVENTION

1. Field of the Invention

The present invention relates to alignment devices and, more particularly, to a two-part device mounted on a trailer tongue socket member and a vehicle hitch ball neck, respectively, and visible to a vehicle driver to allow maneuvering of the vehicle so as to align the ball neck and the socket member for engagement.

2. Description of Related Art

There have been many attempts in the past to provide an alignment device to allow a vehicle driver to align a hitch mounted ball neck on the rear of the vehicle with a trailer hitch socket member on the tongue of a trailer to allow easy engagement therebetween. Prior devices have been either costly, complex, bulky to store, or subject to damage under use.

U.S. Pat. No. Des. 307,354, issued on May 1, 1990, to Mabry pictorially describes an alignment device for hitching trailers and having "C"-configured clamps at the lower end for each of a trailer hitch ball neck and a trailer tongue socket member. The Mabry device in all its embodiments provides for a telescoping upright element on each of its hitch and ball neck devices. The Mabry device is thus easily subject to damage during use and the design is inherently relatively expensive.

U.S. Pat. No. Des. 342,226, issued on Dec. 14, 1993, to Rahn describes a hitch guide attachable to a trailer hitch ball neck by a "C"-shaped clamp configuration and having a ball neck mounted at the top which is visible to a vehicle operator. The Rahn device provides no upright element mountable on the trailer to allow easy alignment therewith and requires a relatively complex design having a telescoping upright, and, thus, the Rahn device is relatively costly and subject to damage.

U.S. Pat. No. Des. 331,900, issued on Dec. 22, 1992, to Simmen describes a trailer hitch alignment guide having a "C"-shaped clamp engagement device which may engage the hitch assembly in two different planes. It is unclear how the embodiment of FIG. 2 is deployed, i.e., whether it attaches to the vehicle ball neck hitch, or the trailer tongue socket member. In any event, the design appears to be easily subject to damage and the pole is either telescoping or of solid construction, adding to design complexity or is bulky to store.

U.S. Pat. No. 4,583,481, issued on Apr. 22, 1986, to Garrison describes a magnetic unit with a vertically extending pole attachable to trailer tongue and a "C"-shaped clamped hitch ball neck engaging unit having a vertically extending pole. The Garrison device is relative complex, subject to damage, and is not readily storable; no provision is made for disassembling the poles or providing a telescoping feature therefor.

U.S. Pat. No. Des. 270,906, issued on Oct. 11, 1983, to Orr describes several embodiments of a matching trailer hitch ball neck and trailer tongue socket member alignment device. Orr does not provide a "U"-shaped clamp for the socket member, and each element appears to be constructed of a single piece of wire stock, making the devices difficult to store and subject to less than vertical pole installation.

U.S. Pat. No. 4,723,788, issued Feb. 9, 1988, to Suter describes a trailer hitch alignment apparatus having a "C"-shaped, offset upright member mounted around the vehicle hitch ball neck, and a swingable latch supporting an upright member for attachment to the trailer tongue socket member. The Suter device employs PVC plastic tubing for a substantial portion of its structure and requires the vehicle operator to mate the vehicle mounted upright into the hollow portion of a trailer tongue mounted half-round of a similar upright. Besides being a difficult maneuver, it may be difficult to remove the latch from the ball neck engaging portion of the trailer tongue when the vehicle attains proper position. The Suter device would appear to be unduly subject to damage as well as difficult to use.

U.S. Pat. No. 5,269,554, issued Dec. 14, 1993, to Law et al. describe a trailer hitch alignment guide having a vehicle hitch ball neck-mounted upright attached by a substantially circular collar with a set screw, and a "U"-shaped support mounted around the periphery of the end of the trailer tongue socket member. The Law et al. system is mechanically complex and would necessarily be relatively expensive.

U.S. Pat. No. Des. 332,595, issued Jan. 19, 1993, to Randolph, U.S. Pat. No. 4,169,610, issued Oct. 2, 1979, to Paufler, U.S. Pat. No. 5,680,706, issued Oct. 28, 1979, to Talcott, U.S. Pat. No. 5,927,229, issued Jul. 27, 1999, to Karr, Jr., U.S. Pat. No. 5,970,619, issued Oct. 26, 1999, to Wells, United Kingdom Patent No. 934,358, published August 1963, French Patent No. 2,387,358, published December 1978, and W.I.P.O. Patent No. WO 90/14968, published December 1990 are cited to further illustrate patents in the field of devices to align trailer hitches, but each suffers from one or more deficiencies, including complexity and attendant cost, fragility, lack of easy dismantling to enable compact storage, or the provision of only one upright member which makes alignment by the vehicle driver much more difficult.

None of the above inventions and patents, taken either singly or in combination, is seen to describe the instant invention as

SUMMARY OF THE INVENTION

The present invention relates generally to alignment devices to align a vehicle's trailer hitch ball unit with a trailer tongue socket member. The present invention includes two units, each having an upright and an engaging press-on member. The trailer hitch ball neck upright unit has a "C"-shaped bottom portion for frictionally engaging the neck of the trailer hitch ball unit, and the trailer tongue socket member upright unit has a "U"-shaped bottom portion for frictionally engaging the outer housing of the trailer tongue socket member around its lower end periphery. When used in conjunction with each other, the two uprights or poles visually assist the vehicle operator in aligning the vehicle and trailer so that they may be easily coupled together for towing.

Accordingly, it is a principal object of the invention to provide a trailer hitch alignment system that is simple in design, readily deployable, and provides marking uprights for both the vehicle hitch ball unit and the trailer tongue socket member, respectively.

It is another object of the invention to provide a trailer hitch alignment system which can be easily dismantled after use to a compact configuration.

It is a further object of the invention to provide a trailer hitch alignment system which is inherently rugged in construction so as not to be susceptible to breakage.

Still another object of the invention is to provide a trailer hitch alignment system which compensates for off center mounting so as to hold the individual uprights directly above the hitch ball neck and the trailer tongue socket member so as to assure alignment when the vehicle is correctly positioned relative to the trailer by aligning the respective upright poles and allowing them to engage by physically touching.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention relates generally to alignment devices to align a vehicle's trailer hitch ball unit with a trailer tongue socket member. The present invention includes two units, each having an upright and an engaging press-on member. The trailer hitch ball neck upright unit has a "C"-shaped bottom portion for frictionally engaging the neck of the trailer hitch ball unit, and the trailer tongue socket member upright unit has a "U"-shaped bottom portion for frictionally engaging the outer housing of the trailer tongue socket member around its lower end periphery. When used in conjunction with each other, the two uprights or poles visually assist the vehicle operator in aligning the vehicle and trailer so that they may be easily coupled together for towing.

Figure 1:
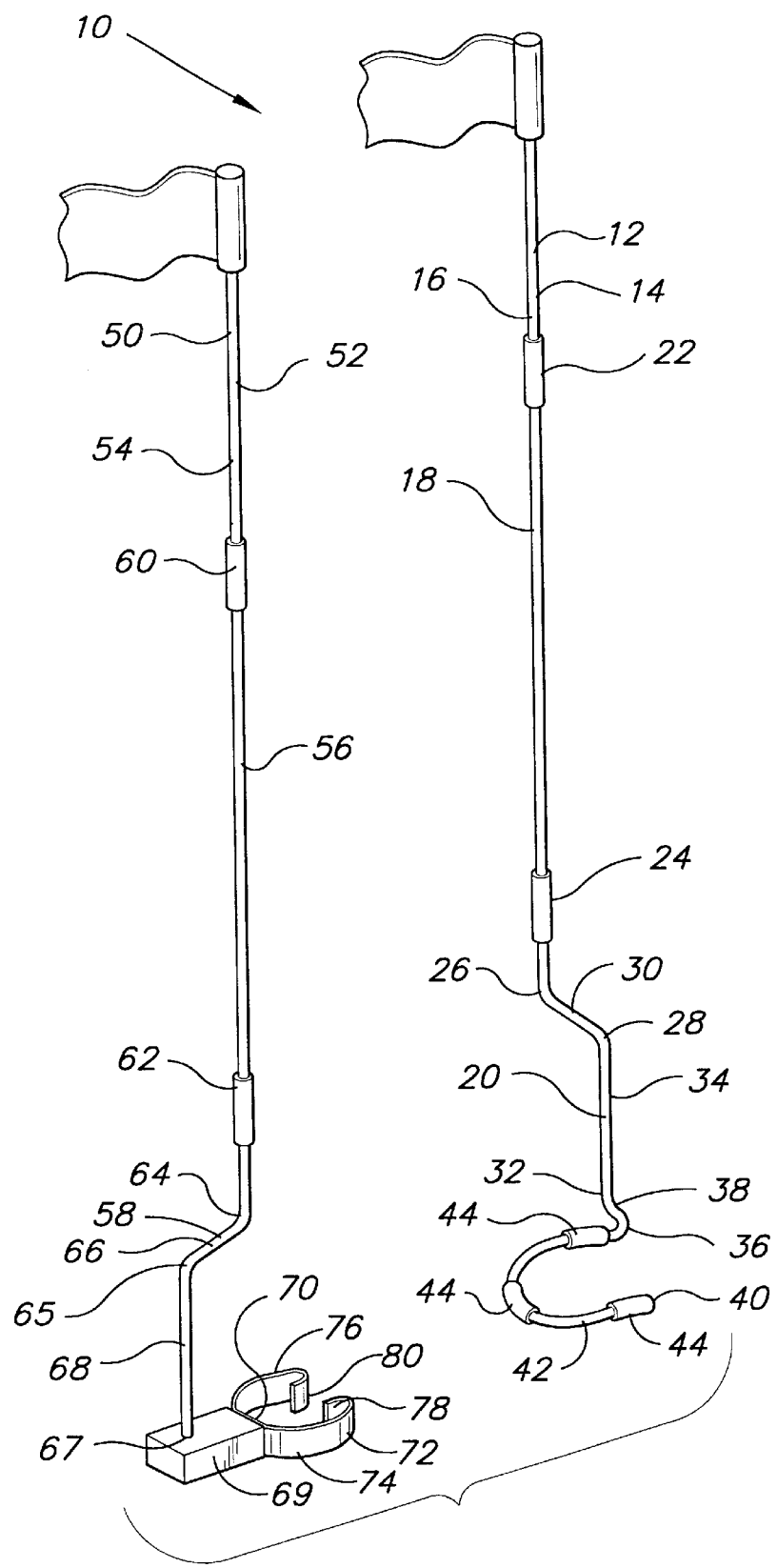
FIG. 1 is a perspective view of a two-part device to align a vehicle mounted trailer hitch and trailer tongue according to the present invention.

Referring to FIG. 1, trailer hitch alignment system 10 is made up of two separate parts. The first part is trailer tongue alignment unit 12, having tongue alignment upright 14. Tongue alignment unit 14 is made up of tongue alignment upright upper portion 16, tongue alignment upright lower portion 18, and tongue alignment engagement element 20. Tongue alignment upper upright ferrule 22 joins tongue alignment upright upper portion 16 to tongue alignment upright lower portion 18 forming tongue alignment upright 14. Tongue alignment lower upright elastomeric ferrule 24 joins tongue alignment upright 14 to tongue alignment engagements element 20. Tongue alignment engagement element 20 extends downward from tongue alignment lower upright elastomeric ferrule 24 and forms a first angle 26 and a second angle 28 defining angle portion 30, the sum of angles 26 and 28 being about 180°.

Tongue alignment engagement element 20 then extends vertically downward to third angle 32, thus defining tongue alignment offset upright portion 34. Third angle 32 should be about 90°. Tongue alignment engagement element 20 then extends to forth angle 36, thus forming horizontal portion 38. Tongue alignment engagement element 20 then extends to tongue alignment engagement element end 40, forming tongue alignment "U"-shaped socket member engagement portion 42. Hitch engagement elastomeric truncated tube elements 44 are distributed around "U"-shaped hitch engagement portion 42 to enhance gripping with the socket member of the trailer tongue.

The second part of trailer hitch alignment system 10 is vehicle hitch alignment unit 50. Vehicle hitch alignment unit 50 includes vehicle hitch upright 52, consisting of vehicle hitch upright upper portion 54 and vehicle hitch upright lower portion 56, mounted on vehicle ball neck engagement element 58. Vehicle hitch upright upper portion 54 and lower portion 56 are joined by upper upright elastomeric ferrule 60 to form vehicle hitch upright which, in turn, is attached to vehicle hitch ball neck engagement element 58 by lower upright elastomeric ferrule 62. Vehicle hitch ball neck engagement element 58 extends downward from upright 52 to first angle 64, and then to second angle 65, thus defining neck engagement element angle portion 66. The sum of angles 64 and 65 is about 180°. Vehicle hitch ball neck engagement element 58 then extends vertically downward to engage rectangular extension block 69 at intersection 67, thus defining ball neck engagement element vertical portion 68. Intersection 67 is at an angle of about 90°. Rectangular extension block 69 then extends horizontally to ball neck engagement element "C"-clamp 72 at attachment point 70. "C"-clamp 72 has centrally located attachment point 70, first "C"-clamp spring side 74, second "C"-clamp spring side 76, first "C"-clamp inward curled end 78, and second "C"-clamp inward curled end 80 opening outward so as to engage a vehicle hitch ball neck.

Figure 2:
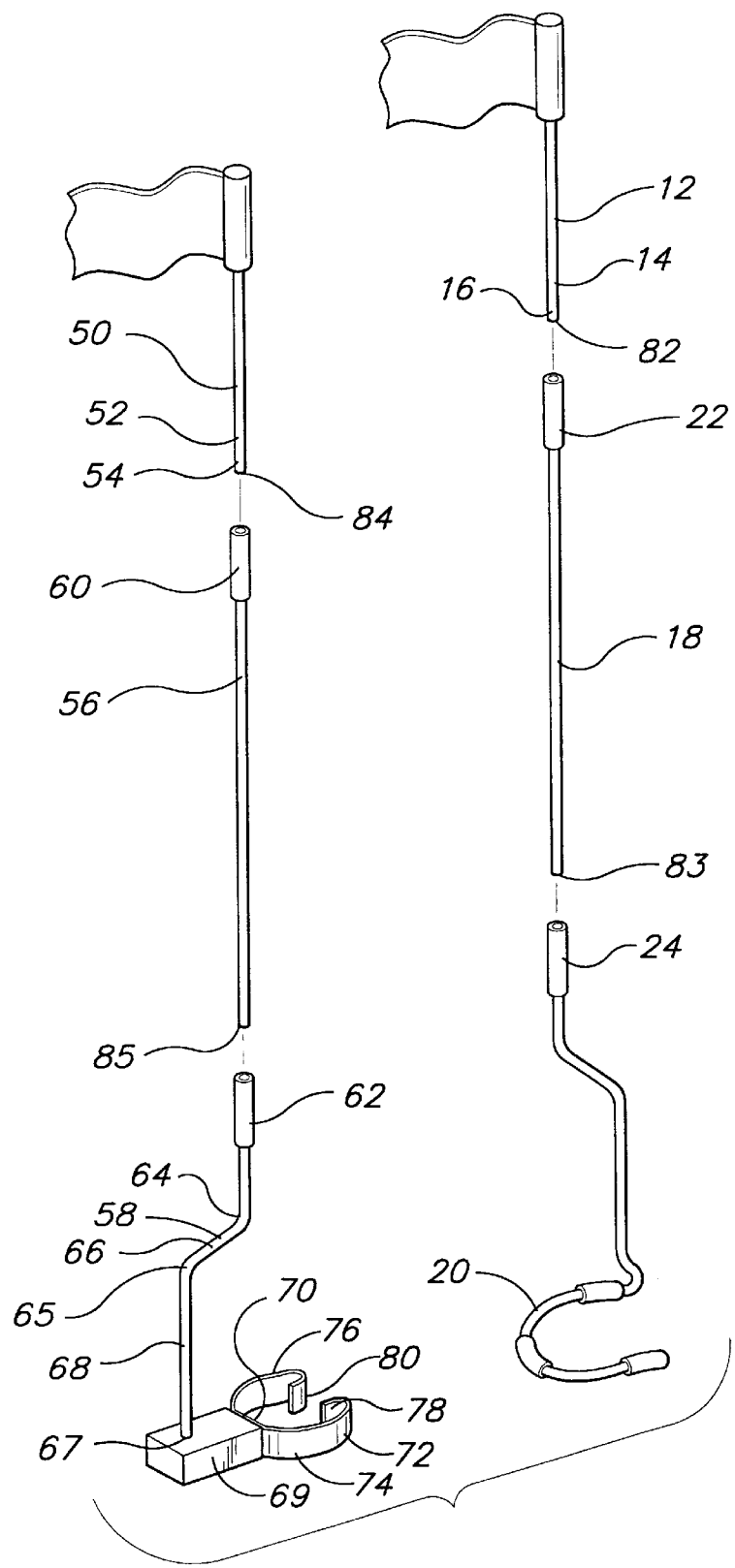
FIG. 2 is an exploded, perspective view of the two-part aligning device of FIG. 1.

Referring to FIG. 2, there is shown an exploded perspective view of the hitch alignment device of FIG. 1, where tongue alignment upright upper portion lower end 82 of upright upper portion 16 is shown removed from tongue alignment upper upright elastomeric ferrule 22, and lower portion lower end 83 of upright lower portion 18 is shown removed from tongue alignment lower upright elastomeric ferrule 24 to expedite storage of trailer tongue alignment unit 12. Also in FIG. 2, vehicle hitch upright upper portion 54 having end 84 and lower portion 56 having end 85 are similarly shown relative to upright elastomeric ferrules 60 and 62, respectively.

Figure 3:
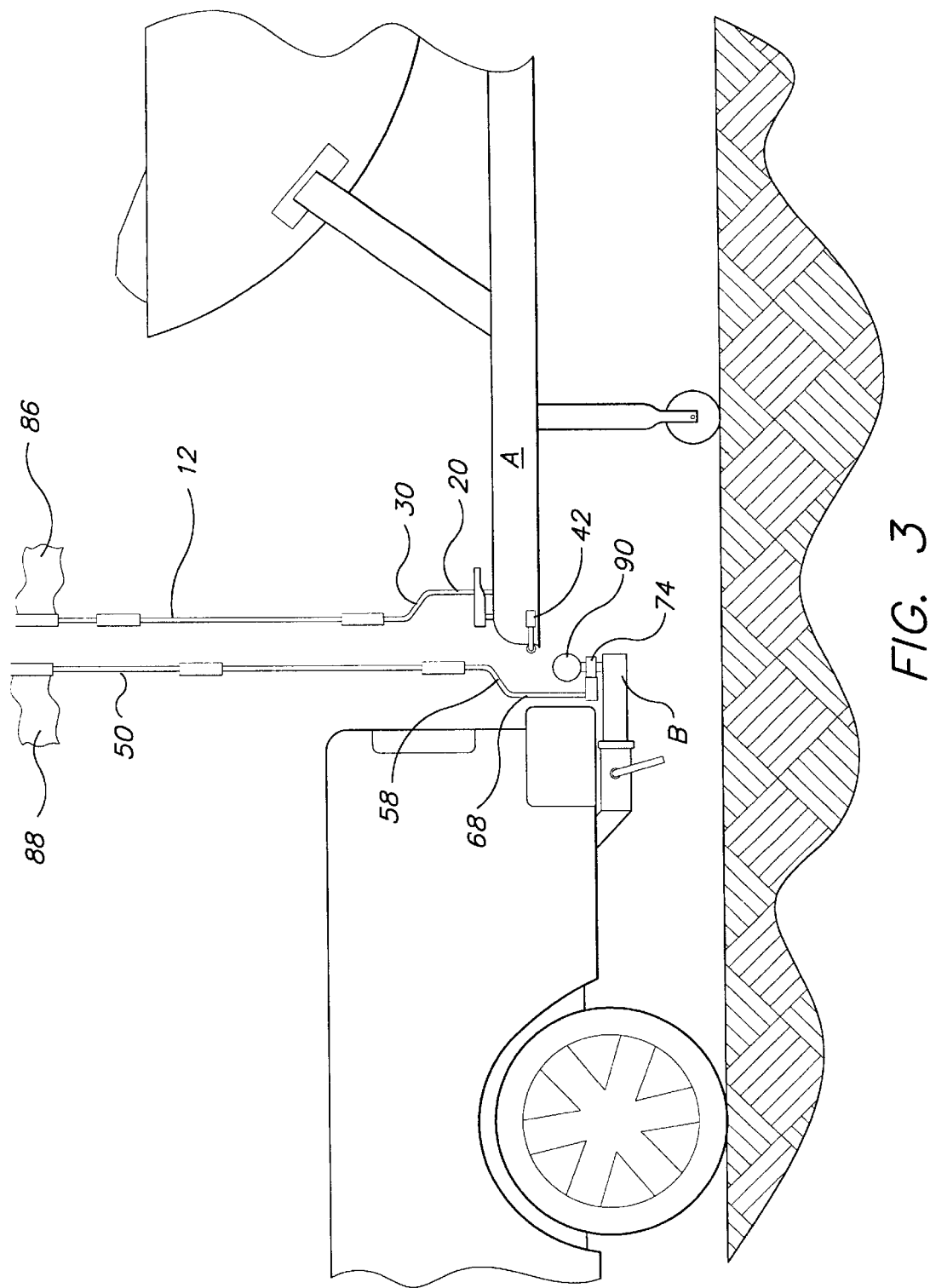
FIG. 3 is an environmental view in elevation of the two-part aligning device of FIG. 1 as mounted on a vehicle hitch and trailer tongue.

Referring to FIG. 3 there is shown an environmental view in elevation of the hitch alignment device of FIG. 1, illustrating the mode of use. Trailer tongue alignment unit 12 is shown mounted by means of tongue alignment engagement element 20 around the trailer tongue socket member A. Vehicle hitch alignment unit 50 is shown mounted by means of ball neck engagement element "C"-clamp 74 around the neck of vehicle hitch ball neck 90, mounted on vehicle hitch B. Flags 86 and 88 may be attached to the upper end of the respective uprights of trailer tongue alignment unit 12, and vehicle hitch alignment unit 50 to further assist the driver in observing alignment of the two uprights. It is noted that tongue alignment engagement element angle portion 30 is of such a length and at such an angle as to allow for clearance of the tongue socket member A while placing the upright portion of trailer tongue alignment unit directly over the midpoint of the socket. It is further noted that ball neck engagement element vertical portion 68 of vehicle hitch ball neck engagement element 58 is sufficiently offset from the upright portion of vehicle hitch alignment unit and is of sufficient length to clear the trailer tongue socket member A and vehicle hitch ball neck 90, while leaving enough clearance to allow the vehicle hitch to be backed up until vehicle hitch alignment flag 88 and tongue alignment flag come into juxtaposition. This indicates that the trailer tongue ball neck engaging member A is vertically aligned with vehicle hitch ball neck 90 and ready for engagement.

The trailer hitch alignment system 10 (see FIG. 1) may then be removed and the trailer tongue ball neck engaging unit A may be easily lowered over vehicle hitch ball neck 90 of vehicle hitch B and engaged in a known manner.

The frames of hitch alignment system 10 may be made of metal rod or tubing. The elastomeric material may be rubber or plastic material such as polyethylene tubing. The flags may be plastic or cloth sheet material.

It is to be understood that the present invention is not limited to the sole embodiment described above, but encompasses any and all embodiments within the scope of the following claims.

We claim:

1. A trailer hitch alignment system for a vehicle and a trailer comprising:
    a) a first vertically oriented alignment unit having an upright portion, and means located at a lower end thereof, for engaging a socket member of a trailer tongue; and
    b) a second vertically oriented alignment unit having an upright portion, and means located at a lower end thereof, for engaging a vehicle hitch ball neck;
    c) said trailer tongue socket member engaging means having an upright portion and a "U"-shaped portion for temporary engagement with said trailer tongue socket member of said trailer tongue, said "U"-shaped portion having elastomeric truncated tube elements distributed therealong to assist in engaging said trailer tongue socket member of said trailer tongue;
    said first and said second vertically oriented alignment units being visible to a vehicle operator having said vehicle hitch ball neck located on the rear, thereof, such that the vehicle can be maneuvered so as to vertically align said hitch ball neck and said trailer tongue socket member for easy engagement therebetween.

2. The trailer hitch alignment system according to claim 1, including at least one elastomeric ferrule along each of said uprights being divided into at least two portions attachable by a corresponding number of elastomeric ferrules for joining said upright portions for alignment system use, and to allow disassembly for storage.

3. The trailer hitch of claim 2, wherein each of said upright portions has an upper portion, each said upper portion having a flag mounted thereon such that the driver can see both flags while backing said vehicle to assist in alignment of said upright portions.

4. The trailer hitch alignment system according to claim 1 wherein said generally upright portion is unitary with said "U"-shaped portion.

5. The trailer hitch alignment system according to claim 4 wherein said trailer tongue socket member engaging means upright portion is offset at a right angle relative to said "U"-shaped portion so as to avoid interference with said second alignment unit.

6. The trailer hitch alignment system according to claim 5, wherein said generally upright portion of said first vertically oriented alignment unit has a first vertical portion and an angle portion connected at a first obtuse angle, an offset upright portion connected with said angle portion at a second obtuse angle which is a complement of said first obtuse angle, a generally horizontal portion connected with said offset upright portion at a third angle, said "U"-shaped portion being connected with said generally horizontal portion at a fourth angle, said third angle and said fourth angle being so complementary such that said offset upright portion is held generally vertical and normal relative to said "U"-shaped portion when said "U"-shaped portion is mounted on a trailer tongue and generally horizontally disposed thereon.

7. The trailer hitch alignment system according to claim 1 wherein said means for engaging a vehicle hitch ball neck comprises a generally upright portion and a generally horizontal clamp portion attached thereto at a lower end thereof.

8. The trailer hitch alignment system according to claim 7, wherein said upright portion is offset from said "U"-shaped portion so as to avoid interference with the ball of the vehicle hitch ball.

9. The trailer hitch alignment system according to claim 8, wherein said generally upright portion has a first vertical portion and an angle portion connected at a first obtuse angle, and an offset vertical portion connected with said angle portion at a second obtuse angle, said second obtuse angle being complementary with said first obtuse angle.

10. The trailer hitch alignment system according to claim 7 wherein said generally horizontal clamp has a ball neck engagement "C"-clamp and a horizontal portion connecting said "C"-clamp with said generally upright portion.

11. The trailer hitch alignment system of claim 10, wherein, said "C"-clamp is elastic and so configured as to secure said vehicle hitch upright to said hitch ball neck upon horizontal force. being applied to said "C"-clamp toward said neck and to separate said vehicle hitch upright from said hitch ball neck upon pulling force being applied to said "C"-clamp away from said neck.

12. A trailer hitch alignment system for a vehicle and a trailer comprising:
    a) a first vertically oriented alignment unit having an upright portion, and means located at a lower end thereof, for engaging a socket member of a trailer tongue; and
    b) a second vertically oriented alignment unit having an upright portion, and means located at a lower end thereof, for engaging a vehicle hitch ball neck;
    c) said trailer tongue socket member engaging means having an upright portion and a "U"-shaped portion for temporary engagement with said trailer tongue socket member of said trailer tongue;
    wherein said generally upright portion of said first vertically oriented alignment unit has a first vertical portion and an angle portion connected at a first obtuse angle, an offset upright portion connected with said angle portion at a second obtuse angle which is a complement of said first obtuse angle, a generally horizontal portion connected with said offset upright portion at a third angle, said "U"-shaped portion being connected with said generally horizontal portion at a fourth angle, said third angle and said fourth angle being so complementary such that said offset upright portion is held generally vertical and normal relative to said "U"-shaped poration when said "U"-shaped portion is mounted on a trailer tongue and generally horizontally disposed thereon; and
    said first and said second vertically oriented alignment units being visible to a vehicle operator having said vehicle hitch ball neck located on the rear, thereof, such that the vehicle can be maneuvered so as to vertically align said hitch ball neck and said trailer tongue socket member for easy engagement therebetween.

13. A trailer hitch alignment system for a vehicle and a trailer comprising:

a) a first vertically oriented alignment unit having an it upright portion, and means located at a lower end thereof, for engaging a socket member of a trailer tongue; and
b) a second vertically oriented alignment unit having an upright portion, and means located at a lower end thereof, for engaging a vehicle hitch ball neck;
c) said trailer tongue socket member engaging means having an upright portion and a "U"-shaped portion for temporary engagement with said trailer tongue socket member of said trailer tongue;

wherein said generally upright portion of said second vertically oriented alignment unit has a first vertical portion and an angle portion connected at a first obtuse angle, and an offset vertical portion connected with said angle portion at a second obtuse angle, said second obtuse angle being complementary with said first obtuse angle said first and said second vertically oriented alignment units being visible to a vehicle operator having said vehicle hitch ball neck located on the rear, thereof, such that the vehicle can be maneuvered so as to vertically align said hitch ball neck and said trailer tongue socket member for easy engagement therebetween.

\* \* \* \* \*